United States Patent
Cherbettchian et al.

[11] Patent Number: 6,151,437
[45] Date of Patent: Nov. 21, 2000

[54] JUNCTION ENCLOSURE FOR FIBER OPTIC TELEMETRY SYSTEM

[75] Inventors: Agop H. Cherbettchian, Santa Monica; Akbar Arab-Sadeghabadi, Simi Valley, both of Calif.

[73] Assignee: Litton Systems, Inc., Woodland Hills, Calif.

[21] Appl. No.: 09/059,023

[22] Filed: Apr. 13, 1998

[51] Int. Cl.[7] .................................................. G02B 6/36
[52] U.S. Cl. ........................... 385/136; 385/134; 385/135
[58] Field of Search ............................. 385/95, 99, 135, 385/136, 134, 137, 138, 139, 53–54, 24, 62, 71

[56] References Cited

U.S. PATENT DOCUMENTS

| | | | |
|---|---|---|---|
| 4,252,407 | 2/1981 | Bubanko et al. | 385/59 |
| 5,146,532 | 9/1992 | Hodge | 385/136 |
| 5,771,324 | 6/1998 | Hargis | 385/43 |
| 5,999,683 | 12/1999 | Gustafsson | 385/136 |

*Primary Examiner*—John D. Lee
*Assistant Examiner*—Juliana K. Kang
*Attorney, Agent, or Firm*—Elliott N. Kramsky

[57] ABSTRACT

A readily-serviced junction for a fiber optic telemetry system includes at least one box for receiving cables that communicate with downstream optical sensors. The cables comprise commingled input-path and return-path optical fibers. A manifold-type arrangement of metallic enclosure tubes is arranged to direct the optical fibers, once stripped of the outer jackets of the cables, toward the light source and detectors of the telemetry system. A splice protection box houses couplers of the telemetry system. The boxes of the junction are easily assembled and dissembled to facilitate installation and servicing.

14 Claims, 5 Drawing Sheets

JUNCTION ENCLOSURE FOR FIBER OPTIC TELEMETRY SYSTEM

The invention herein claimed was made under contract number N66604-95-C-004 with the United States Department of the Navy.

BACKGROUND

1. Field of the Invention

The present invention relates to cabled fiber optic telemetry systems. More particularly, this invention pertains to a junction for facilitating the routing and protection of the optical fibers for carrying input and return signals in such systems between downstream (or remote) sensors and an upstream (or home) source and detectors.

2. Description of the Prior Art

Fiber optic telemetry systems are routinely employed in configurations wherein multiple remote ("downstream") sensors, such as hydrophones, communicate with an on-board or home ("upstream") light source and detectors. The telemetry required to monitor vast arrays of downstream sensors may involve a multiplicity of light transmission routes (via dedicated optical fibers) between the downstream sensors and the upstream source and detectors. In such applications, an input and a return path comprising optical fiber associated with each sensor includes a downstream cable(s) within which both are gathered for any particular sensor. Such gathering of fibers that communicate with various sensors provides both shielding and mechanical durability.

The commingling of return-path and input path fibers within a single cable poses inherent problems as signals are input and read upstream by distinct apparatus (i.e. source and detectors). Accordingly, fiber re-routing must necessarily occur somewhere between the home and remote terminals of such a system.

The routing and protection of optical fiber in systems of the above type can pose considerable problems. Each individual fiber possesses substantially no rigidity and is therefore subject to tangling. Furthermore, many splices may be required within such a system due, for example, to incompatibilities (in terms of fiber-carrying capacities) between, for example, the optical cabling of a home ship and a remote sensor array.

The splicing of couplers into a multiply of fiber lines can be a nightmare for the technician and misconnections may be disastrous. Furthermore, each splice lessens fiber integrity and must be protected from the environment.

SUMMARY OF THE INVENTION

The present invention addresses the foregoing and other problems of the prior art by providing, in a first aspect, a junction for a fiber optic telemetry system. At least one closed box is located intermediate the upstream and downstream ends of the system. Such box has at least one internal cavity. The box comprises multiple, longitudinally-matching elements that include straight facing edges. Indentations within such edges define a plurality of apertures within the upstream and downstream walls of the box.

In a second aspect, the present invention provides an improvement in a fiber optic telemetry system of the type wherein the output of a light source is input to a cable that includes at least one optical fiber, then split by at least one coupler and applied to a plurality of fibers, each being the input fiber of at least one remote sensor. A return fiber is also associated with the sensor. The input and return fiber are gathered within at least one cable. At least one optical detector is provided for receiving optical output signals transmitted through the return fibers.

The improvement provided by the invention includes at least one routing box for receiving the cable. The routing box includes means for separating the input fibers from return fibers. A splice box is provided for housing at least one coupler. The boxes are longitudinally-displaced with respect to one another. Means are provided for housing the fibers. Such means are arranged to direct at least one input fiber from a routing box to the splice protection box and to direct at least one return fiber to the detectors.

The features and advantages of this invention will become further apparent from the detailed description that follows. Such description is accompanied by a set of drawing figures. Numerals of the drawing figures, corresponding to those of the written description point to the features of the invention with like numerals referring to like features throughout both the drawing figures and the written description.

DETAILED DESCRIPTION OF THE PREFERRED EMBODIMENT

Figure 1:
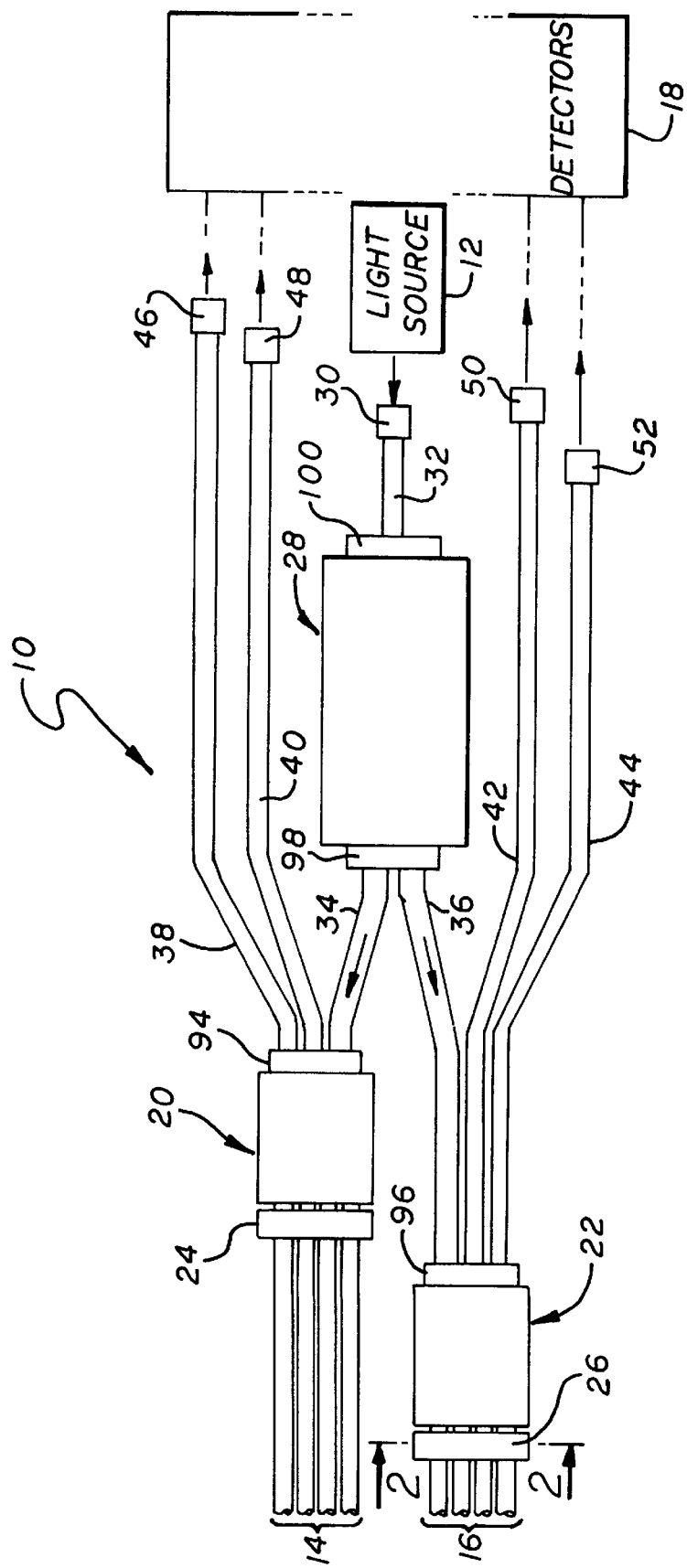
FIG. 1 is a schematic representation of a telemetry junction in accordance with the invention.

FIG. 1 is a schematic representation of a telemetry junction 10 in accordance with the invention. The junction 10 supports the necessary fiber couplings between an upstream light source 12 and detectors 18 with downstream optical sensors (not shown). For the purpose of the disclosure that follows, downstream-generated sensor outputs and inputs communicate through sets of cables 14, 16 with each individual cable of the sets 14 and 16 assumed to carry a multiplicity of input path and return path fibers.

The sets of cables 14, 16 are received by fiber routing boxes 20 and 22. The locations of the routing boxes 20, 22 are staggered with respect to one another to provide installation compactness for passage through small apertures or ports. Clamps 24, 26, associated with the fiber routing boxes 20 and 22 respectively, position the ends of the cables facilitating management and handling within often-encountered installation (and repair) areas of extremely limited accessibility. Assembly details of the clamps 24, 26 are illustrated and discussed below.

A splice protection box 28 is optionally provided should, as is often the case, optical splices be required to insert couplers into the input fiber network of the telemetry system. It will be appreciated from the discussion that follows that the boxes 20 and 22 may provide alternate locations for the sheltering of splices.

Light emitted from the source 12 is transmitted through a cable (not shown), entering the junction 10 through an upstream optical connector. Such a connector 30 is taught, for example, by U.S. Pat. No. 5,590,229 of Goldman et al. entitled "Multichannel Fiber Optic Connector."

Optical fibers from the connector 30 are enclosed within a metallic fiber enclosure tube 32, preferably of stainless steel or aluminum, fixed, at one end, to the connector 30 and, at the opposed end, to the splice protection box 28. The splice protection box 28 provides a convenient location within the telemetry system to house the couplers spliced onto the input path optical fibers that receive the output of the light source 12 and thereby multiply the number of input fibers as one proceeds downstream from the source 12. The input path-dedicated optical fibers are directed to the fiber routing boxes 20 and 22 by metallic fiber enclosure tubes 34 and 36 respectively. Similarly, pairs of detector enclosure tubes 38, 40 and 42, 44 are provided for housing the return-path dedicated optical fibers (not shown) that bring output signals from the downstream optical sensors. The tubes 38, 40, 42 and 44 terminate, at their remote ends, in optical connectors 46, 48, 50 and 52 respectively for engaging similar connectors of optical cables (not shown) engaged to the detectors 18. As in the case of the connector 30, the connectors 46 through 52 may be of the type disclosed in U.S. Pat. No. 5,590,229.

Figure 2:
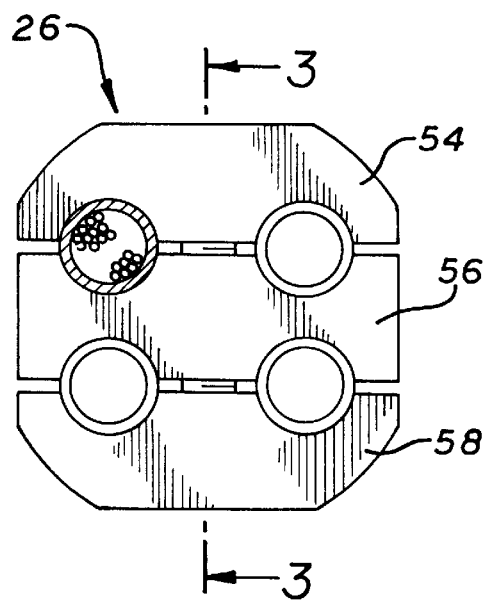
FIG. 2 is a sectional view taken at line 2—2 of FIG. 1 for illustrating a representative clamp of the invention.
Figure 3:
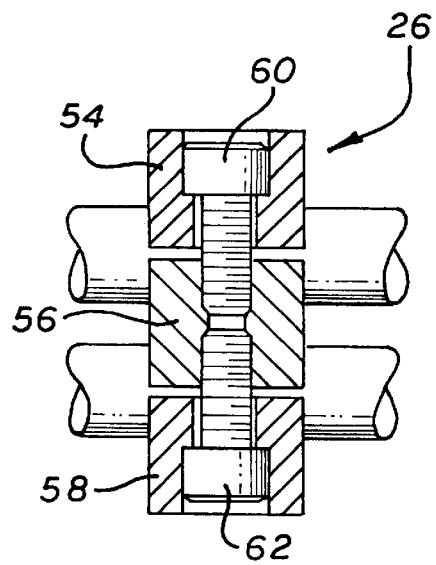
FIG. 3 is a sectional view taken at line 3—3 of FIG. 2 for illustrating the manner in which the clamp is secured to hold the cables of optical fiber.

FIG. 2 is a sectional view taken at line 2—2 of FIG. 1 for illustrating the arrangement of the representative clamp 26. As shown, the clamp 26 comprises three members 54, 56 and 58. The members 54 and 58 include rounded edges to avoid damage, for example, to unrelated cabling should the fiber optic telemetry system be harnessed to other cabling. Each of such members includes at least one straight internal edge having semicircular indentations either machined or punched therein. As a consequence, upon securing the clamp, circular apertures are provided for accommodating and holding the four cables 16. FIG. 3, a sectional view taken at line 3—3 of FIG. 2, illustrates the manner in which the clamp is secured to hold the cables of optical fiber. As can be seen, countersunk screws 60 and 62 separately connect the members 54 and 56 to one another and the members 58 to 56 to one another along predetermined facing straight edges to thereby form the above-described circular apertures. As a result, one's ability to handle or manage the multiple cables 16 for inputting to the box 22, especially in tight quarters, is facilitated. That is, one can first secure, for example, the upper pair of cables by arranging the members 54 and 56 about that pair of cables, ignoring the others while and securing that engagement by inserting and tightening the screw 60. Thereafter, the lower pair may be similarly secured, without concern for the upper pair of cables, by aligning the member 58 with the member 56 as shown in FIG. 2, then tightening the hex cap screw 62. The ability to simplify processes by cutting task complexity at least in half greatly reduces the human effort required when working in close quarters. As a result, personnel are considerably less likely to make critical mistakes.

Figure 4:
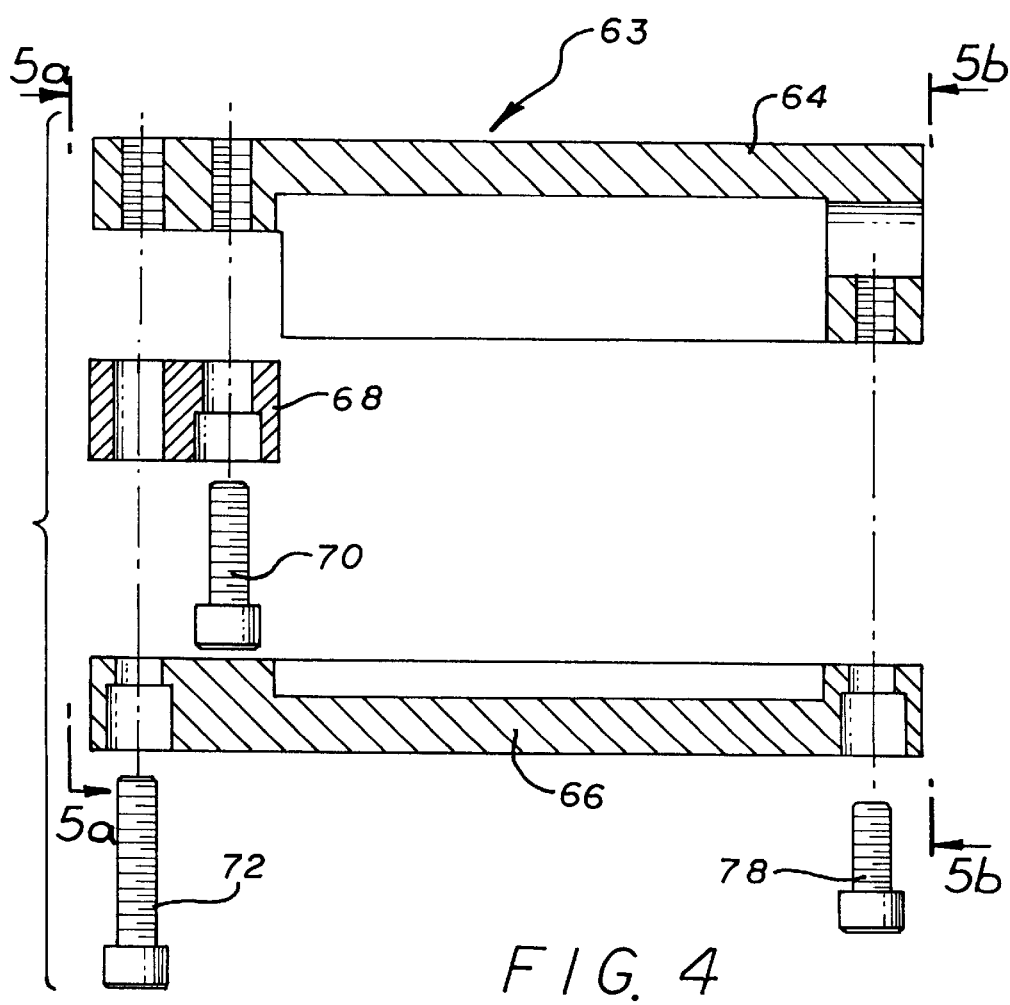
FIG. 4 is an exploded side elevation view of a fiber routing box.

FIG. 4 is an exploded side elevation view of a fiber routing box 63 (identical to either of the boxes 20 or 22 of FIG. 1). The fiber routing box 63 serves as the location within the junction 10 for separation of the return path-directed fibers from the input path-dedicated fibers commingled with one another within the cables 14 or 16. Conversely, looking downstream, they can be considered as the gathering locations for fibers from the detectors 18 and the light source 12 into downstream sensor-directed cables.

Figure 5A:
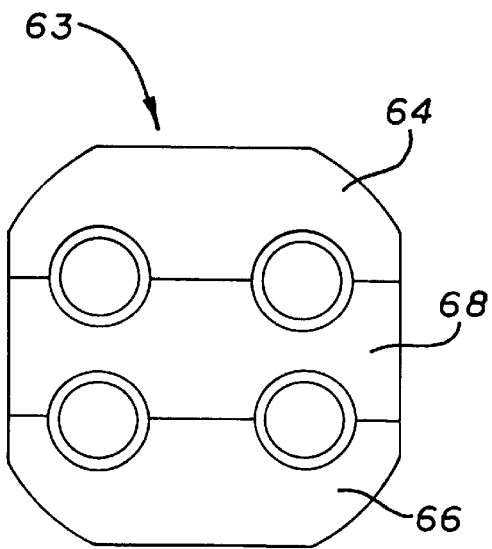
FIGS. 5(a) and 5(b) are downstream and upstream elevation views, respectively, of the end walls of a routing box.
Figure 5B:
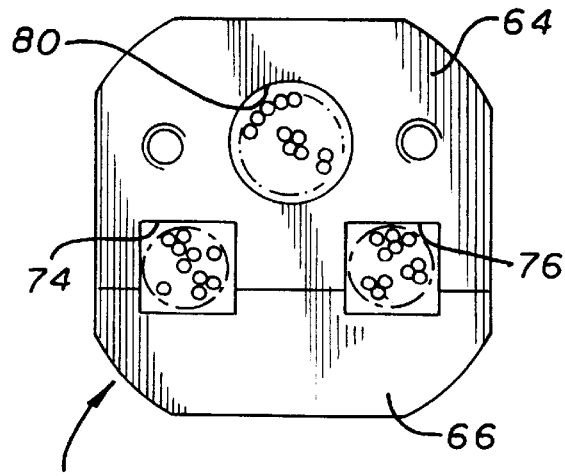

Referring to FIG. 4 in combination with FIGS. 5(a) and 5(b) downstream and upstream elevation views of the end walls of the (assembled) fiber routing box 63 respectively, it can be appreciated that, just as in the case of the three-piece clamps 24 and 26, the downstream end wall is formed of three members 64, 66 and 68, each having a straight edge with semicircular recesses on mutually-facing edges for forming circular apertures to accommodate the optical cables. As shown in FIG. 4, two of such pieces may be joined independently of the third, again allowing one to work on two of the four cables at a time. For example, the members 64 and 68 may first be secured to clamp two optical cables at the top half of the box 63 by means of a screw 70. Within the box, the outer jackets of the two cables are stripped so that input fibers can be separated from return fibers, then routed. Thereafter, the remaining pair of optical cables may then be clamped, stripped, routed and the somewhat-longer screw 72 (and a screw 78) tightened to close the box 63. As in the case of the clamps, such arrangement insures ready manageability of the four cables. As shown in FIG. 5(b), the return fibers of the cables, after sorting within the box 63, can pass through square apertures 74, 76 within the upstream wall formed by matching indentations in facing edges of the members 64 and 66. A circular aperture 80 is provided for routing input optical fibers.

Figure 6:
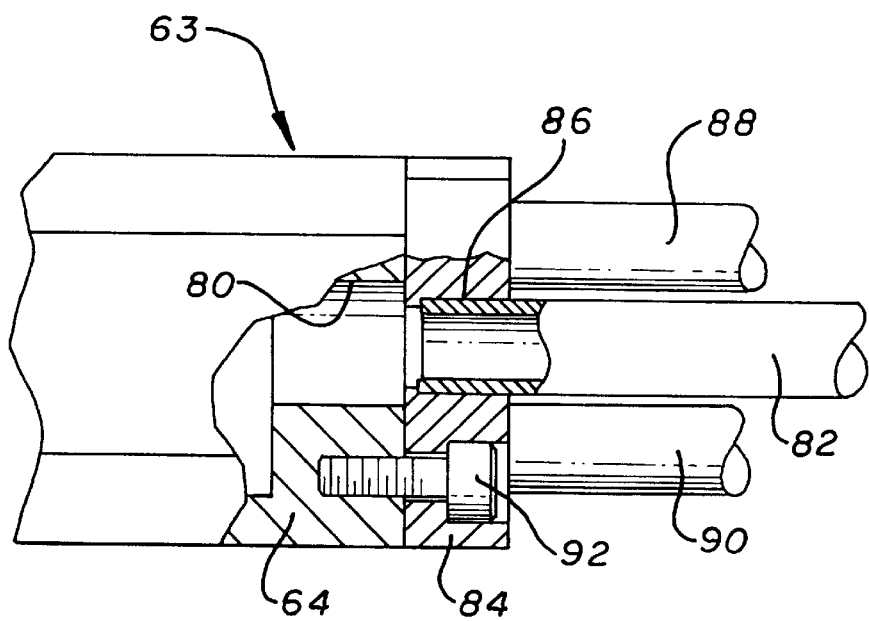
FIG. 6 is a top plan view, partly in section, of a fiber routing box for illustrating the manner of fixation of a fiber enclosure tube.

FIG. 6 is a top plan view, partly in section, of the fiber routing box 63 for illustrating the manner of fixation of a representative fiber enclosure tube 82. The discussion of such arrangement applies equally to all interfaces of boxes with metallic fiber enclosure tubes as shown in FIG. 1. As can be seen, a flange 84 is provided in abutment with the (in this case) upstream wall of the box 63. The tube 82 is fixed to the flange 84 by solder braze 86. The fiber enclosure tubes 82, 88 and 90, each soldered to the flange 84, are attached to the member 63, and thereby to the end of the fiber routing box 63, by means of screws, one of which is illustrated at 92. Referring back to FIG. 1, it may be observed that similar tube mounting flanges 94, 96, 98 and 100 are fixed to appropriate end walls of the boxes 20, 22 and 28 for securing communicating ends of the tubes 32 through 44. Each of such ends is soldered to an end flange as illustrated in FIG. 6. Further, as shown in FIG. 6, each of the end flanges is readily separable from the end walls of the boxes, being fastened thereto by means of screws. The enclosure tubes with soldered flange ends comprise an integral structure that is readily attachable (and detachable) from the arrangement of boxes 20, 22 and 28. As such, the end flanges and the metallic tubes do not interfere with the internal designs of the boxes, providing only conduits therebetween.

Figure 7:
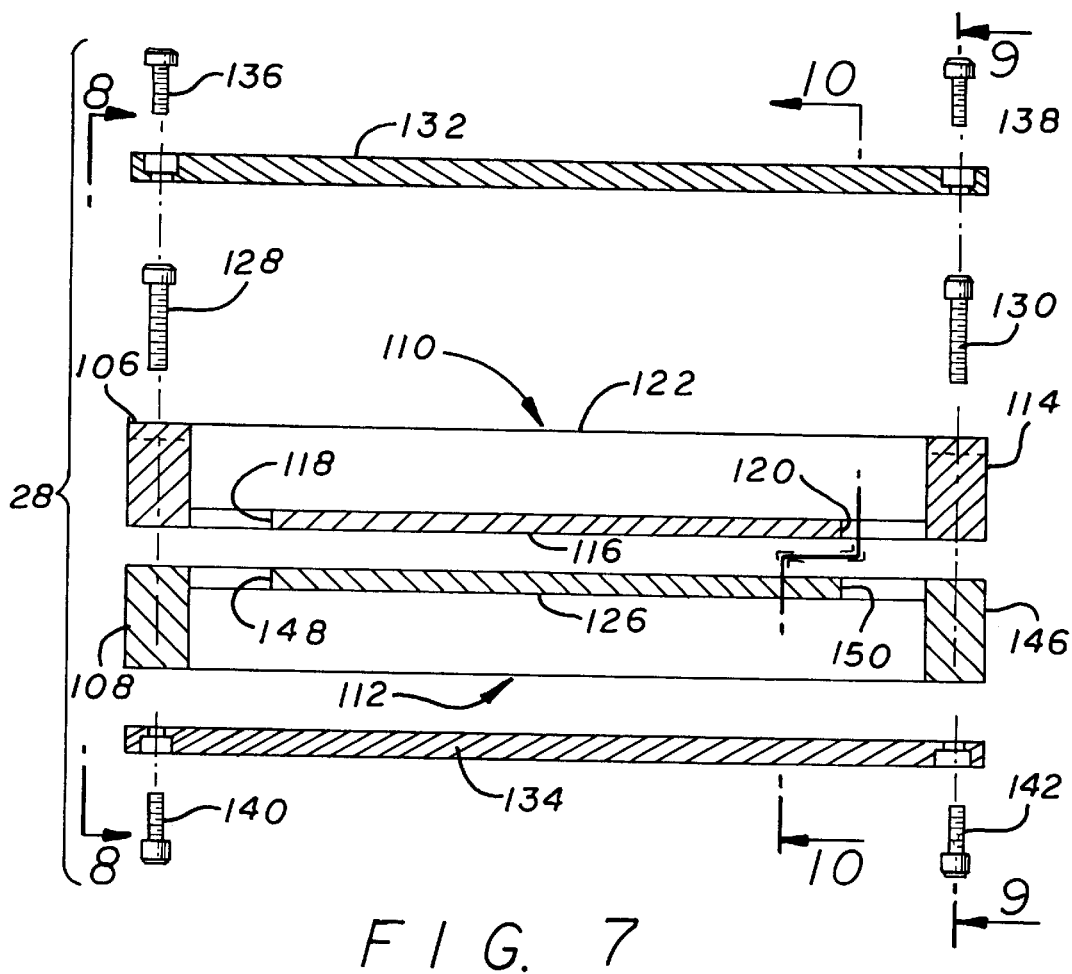
FIG. 7 is an exploded side sectional view of a splice/coupler protection box.

FIG. 7 is an exploded side sectional view of the splice/coupler protection box 28. Again, the box 28 provides an easily-assembled structure of multiple parts held together by means of counter-sunk screws. Referring to FIG. 7 in combination with FIG. 8, an end elevational view of the assembled splice/coupler protection box 28 taken generally on line 8—8 of FIG. 7 and FIG. 9, a cross-sectional view taken on line 9—9 of FIG. 7, one may again observe that a pair of circular apertures 102, 104 is provided in the downstream end wall of the box 28 upon the engagement of end wall members 106 and 108 of upper and lower shell elements 110 and 112 to one another.

The shells 110, 112 constitute mirror images of one another. Referring to the upper shell 110 by way of explanation, it is seen to comprise a walled arrangement including opposed end walls 106 and 114 spaced from one another by means of a floor 116 that includes slotted end portions 118 and 120. Sidewalls, including the sidewall 122 are spaced from one another at either edge of the floor 116, giving the upper shell 110 (as well as the lower shell 112) an open box-type structure.

Figure 10:
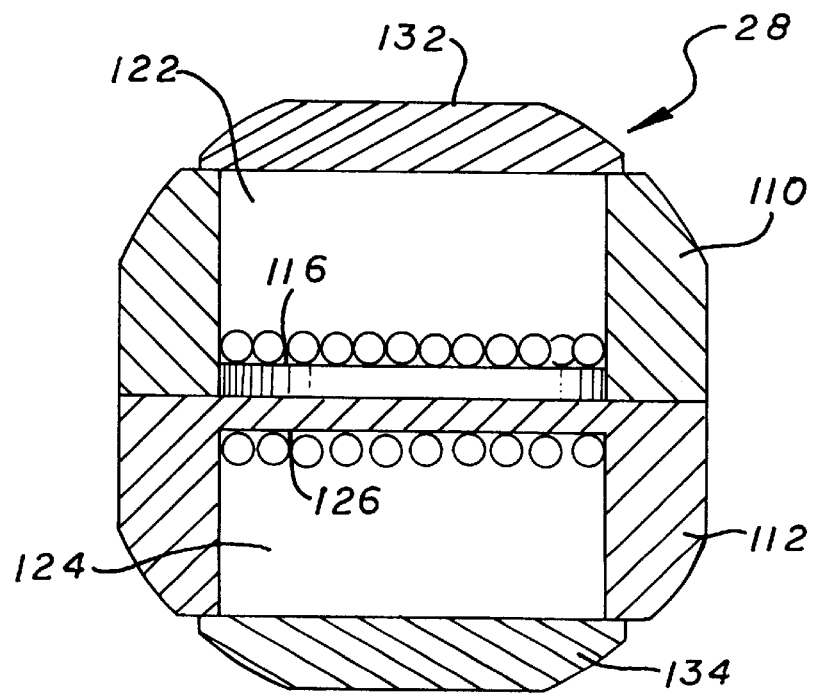
FIG. 10 is a sectional view taken on line 10—10 of FIG. 7.

When assembled, the upper and lower shells 110, 112 abut one another as shown in FIG. 7 to provide an interior horizontal separation plane or partition observed most clearly in FIG. 10, a sectional view taken on line 10—10 of FIG. 7. As shown in FIG. 10, separate upper and lower chambers 122 and 124 respectively are thereby defined within the box 28. The back-to-back arrangement of the upper and lower shells is secured by means of countersunk screws 128, 130. An upper cover 132 and a lower cover 134 fixed at their opposed ends to the end walls of the shells 110, 112 by means of screws 136, 138, 140 and 142 render the upper and lower chambers 122, 124 fully closed to the environment and thereby protective of the otherwise-exposed optical fibers, splices and couplers therein.

Figure 9:
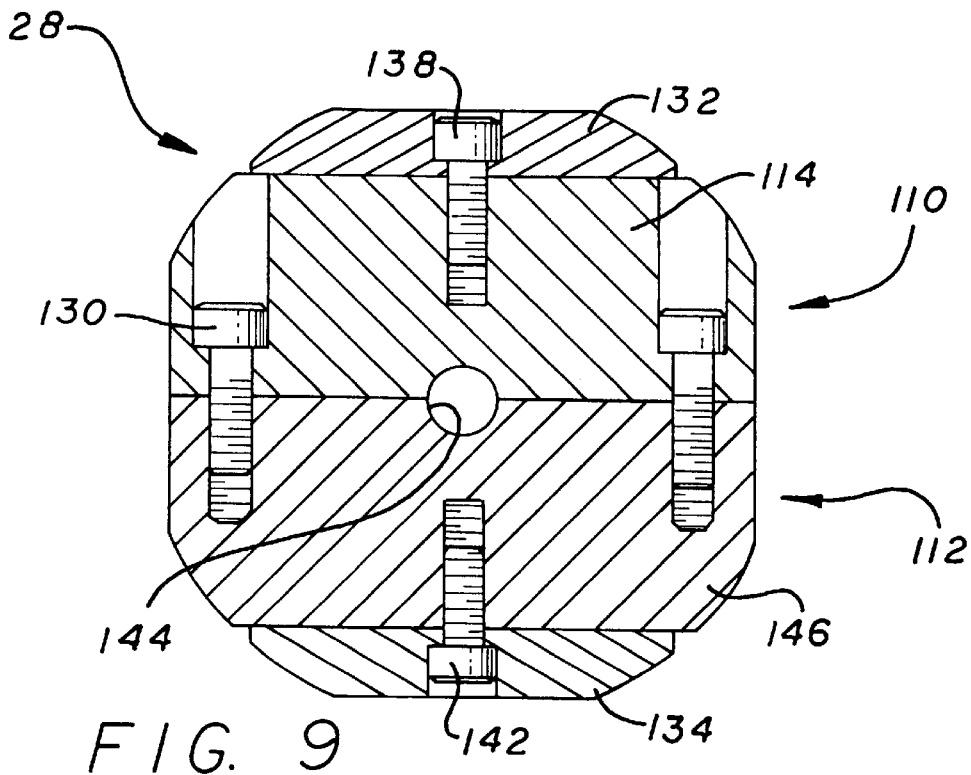
FIG. 9 is a cross-sectional view taken on line 9—9 of FIG. 7.

Optical fibers within the upper and lower chambers 122 and 124 are exposed after passage through the medal tubes that communicate with the source 12 and the boxes 20 and 22. This permits one to-perform that necessary splicing of fibers and insertion of optical couplers for sharing the output of the light source 12 with all input optical-path fibers that feed the array of optical sensors downstream. Referring to FIG. 9, a circular aperture 144 is created at the center of the upstream wall of the box 28 by the abutment of the end wall 114 of the upper shell 110 with an end wall 146. Such circular aperture permits passage of input optical path fibers (carried within the tube 32 that is soldered to the end flange 100), into the interior chambers of the box 28. Again, semicircular grooves formed in facing edges, this time of the end walls 114, 146 of the shells 110 and 112 respectively, contribute to the circular aperture 144.

The partitioning of the interior of the box 28 into an upper chamber 122 and a lower chamber 124, in combination with the slots 118, 120, 148 and 150 at the edges of the floors 116 and 126 provide a means for separating, and thereby separately handling, one half of the fiber splicing at a time. This greatly simplifies the complexity of the process and minimizes opportunities for mismatching fibers as well as tangling and breaking. Furthermore, by providing a box enclosure for the splices, the additional processing and bulk of shrink wrapping or other splice protection processes is avoided.

Figure 8:
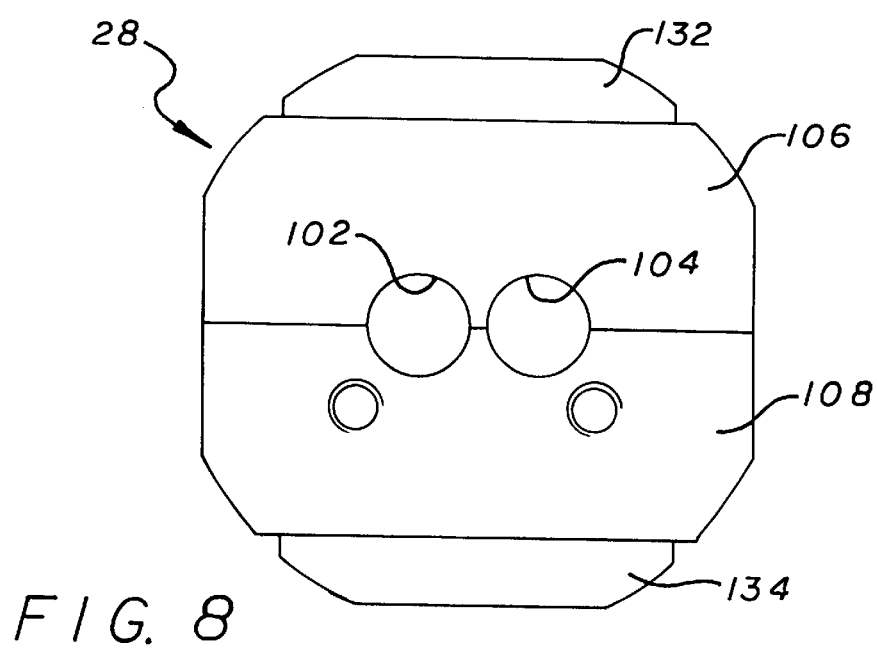
FIG. 8 is an end elevation view of a splice/coupler protection box taken generally on line 8—8 of FIG. 7.

The incoming input path fibers enter through the aperture 144 into an opening of the wall-like partition created by the matching end slots 120 and 150. At this point, a portion of the fibers may be selectively routed above the floor 116 of the upper shell 110 while the remaining portion may be routed below the floor 126. Within the (then open) chambers of the box 128, appropriate splicings may be made separately to the set "above partition" and "below partition" fibers respectively with splices arranged and sorted adjacent the respective floors 116, 126. Thereafter, the resulting arrangements of fibers may be routed through either of the apertures 102 and 104 within the downstream endwall of the box 28 as shown in FIG. 8. It is obviously advantageous, and a feature of this invention, that the separate internal chambers provide an opportunity to route all fiber connections for subsequent passage through one of the apertures 102 or 104 into one of the two chambers 122 and 124 while the other fibers are routed to the other chamber. In this way, fibers needing repair, etc. may be readily and easily accessed.

Thus it is seen that the present invention provides apparatus for facilitating the management of the numerous optical fibers of a multi-sensor fiber optic telemetry system. By employing the teachings of this invention, one may handle the necessary interconnections and routing required to assure optical communication between downstream sensors and an upstream light source and photodetectors with minimal risk to the integrity of the flimsy and somewhat-fragile optical fibers. The junction apparatus of the invention provides shielding of the optical fibers throughout to avoid environmental bias sources while providing individual elements that are readily-assembled and readily disassembled for troubleshooting, repair and the like.

While this invention has been described with reference to its presently-preferred embodiment, it is not limited thereto. Rather, this invention is limited only insofar as it is defined by the following set of patent claims and includes within its scope all equivalents thereof.

What is claimed is:

1. A junction for a fiber optic telemetry system comprising, in combinations:

a) at least one closed box intermediate the upstream and downstream ends of said system;

b) said at least one box having at least one internal cavity comprising multiple, longitudinally-matching elements including straight facing edges; and c) indentations located within said edges defining a plurality of apertures within upstream and downstream walls of said at least one box;

d) at least one tube, said at least one tube being in communication with apertures within at least one of said walls;

e) at least one end flange, said at least one end flange having at least one internal aperture for receiving a tube;

f) an end of said tube being solder brazed to said flange; and g) said at least one flange being removably fixed to an end wall of said box.

2. A junction as defined in claim 1 wherein said box further includes:

a) an internal horizontal plane for defining upper and lower internal chambers; and b) said plane having slots adjacent to said walls.

3. A junction as defined in claim 1 further including:

a) at least one clamp;

b) said at least one clamp being positioned proximate the downstream wall of said at least one box;

c) said at least one clamp comprising multiple, longitudinally-matching elements including straight facing edges; and d) indentations located within said edges defining a plurality of apertures.

4. A junction as defined in claim 3 wherein said indentations are semicircular to form circular apertures within said clamps.

5. In a fiber optic telemetry system of the type wherein the output of a light source is input to a cable including at least one optical fiber, then split by at least one coupler and applied to a plurality of fibers, each of said fibers being the input fiber of at least one remote sensor, there being a return fiber also associated with said at least one sensor, said at least one input fiber and said at least one return fiber being gathered within at least one cable and at least one optical detector for receiving optical output signals transmitted through said return fibers, the improvement comprising, in combination:

a) at least one routing box for receiving said at least one cable;

b) said at least one routing box including means for separating said input fibers from said return fibers;

c) a splice protection box for housing said at least one coupler;

d) said splice protection box and said at least one routing box being longitudinally-displaced with respect to one another; and e) means for housing said fibers, said means being arranged to direct said at least one input fiber from said splice protection box to said at least one routing box and to direct said at least one return fiber to said detectors.

6. A fiber optic telemetry system as defined in claim 5 wherein said means for housing comprises an arrangement of metallic tubes.

7. A fiber optic telemetry system as defined in claim 6 further including a clamp proximate to said at least one routing box for securing said cable.

8. A fiber optic telemetry system as defined in claim 7 wherein said clamp further includes:

a) at least two distinct clamp members; and b) each of said members has a semicircular indentation along a facing edge whereby, when assembled, a circular hole is formed therein for accommodating said at least one cable.

9. A fiber optic telemetry system as defined in claim 8 wherein said clamp further includes:

a) an upper, a central and a lower clamp member; and b) each of said clamp members has at least one semicircular indentation along mutually facing edges whereby at least two circular apertures are provided for securing cables.

10. A fiber optic telemetry system as defined in claim 9 wherein said clamp further includes a pair of semicircular indentations within the mutually facing edges of said clamp members whereby four circular apertures are provided for securing cables.

11. A fiber optic telemetry system as defined in claim 6 wherein said at least one routing box further includes:

a) means for receiving a plurality of cables; and b) said means includes means for independently securing cables.

12. A fiber optic telemetry system as defined in claim 11 wherein said means for independently securing cables further comprises:

a) said at least one routing box includes a downstream wall and an upstream wall in spaced relationship;

b) said downstream wall comprising at least three mateable, independently-securable elements; and c) each of said mateable elements including at least one matching semicircular indentation located at a facing edge for forming a circular aperture for receiving a cable.

13. A fiber optic telemetry system as defined in claim 12 wherein said upstream wall of said at least one routing box further includes a plurality of apertures for distributing fibers.

14. A fiber optic telemetry system as defined in claim 5 wherein said splice protection box further comprises:

a) an internal horizontal planar member for defining an upper and a lower chamber; and b) said planar member having a pair of slots.

* * * * *